United States Patent
Munoz Melgar et al.

(10) Patent No.: US 11,242,027 B2
(45) Date of Patent: Feb. 8, 2022

(54) FRONT AIRBAG OF A VEHICLE PASSENGER RESTRAINT SYSTEM

(71) Applicant: Dalphi Metal Espana, S.A., Vigo (ES)

(72) Inventors: Ruth Munoz Melgar, Valladolid (ES); Michel Calzada Adeva, Valladolid (ES)

(73) Assignee: DALPHI METAL ESPANA S.A., Vigo (ES)

( * ) Notice: Subject to any disclaimer, the term of this patent is extended or adjusted under 35 U.S.C. 154(b) by 16 days.

(21) Appl. No.: 16/648,724

(22) PCT Filed: Sep. 25, 2018

(86) PCT No.: PCT/EP2018/075967
§ 371 (c)(1),
(2) Date: Mar. 19, 2020

(87) PCT Pub. No.: WO2019/063549
PCT Pub. Date: Apr. 4, 2019

(65) Prior Publication Data
US 2020/0223390 A1  Jul. 16, 2020

(30) Foreign Application Priority Data
Sep. 29, 2017 (DE) ............... 10 2017 122 681.8

(51) Int. Cl.
*B60R 21/231* (2011.01)
*B60R 21/2338* (2011.01)
(Continued)

(52) U.S. Cl.
CPC ........ *B60R 21/2338* (2013.01); *B60R 21/231* (2013.01); *B60R 21/205* (2013.01);
(Continued)

(58) Field of Classification Search
CPC . B60R 21/2338; B60R 21/231; B60R 21/205; B60R 21/237; B60R 2021/23382;
(Continued)

(56) References Cited

U.S. PATENT DOCUMENTS 6,419,262 B1  7/2002  Fendt et al.
10,384,635 B2  8/2019  Aranzulla et al.
(Continued)

FOREIGN PATENT DOCUMENTS

DE  19707997  9/1998

*Primary Examiner* — Keith J Frisby
(74) *Attorney, Agent, or Firm* — Tarolli, Sundheim, Covell & Tummino LLP

(57) ABSTRACT

A front airbag of a vehicle occupant restraint system comprises an outer cover including a front wall and a peripheral wall, wherein a fixing portion (22) for fixing the front airbag tightly to the vehicle is provided on the peripheral wall and the front wall constitutes a baffle for the vehicle occupant and includes a circumferential first peripheral edge (20) which is circumferentially connected at a circumferential second peripheral edge (24) of the peripheral wall to the latter. The length of the two peripheral edges (20, 24) is equal. The front wall includes a cut (12) that is flatly spreadable. The front wall cut (12) has at least one notch (28) starting from the first peripheral edge (20) at two connecting points (32), wherein from each of the connecting points (32) an edge portion (34) of the notch (28) extends into the interior of the front wall cut (12) so that the two edge portions (34) are convergent in V-shape and meet in one point. In the finished front airbag, the two edge portions are connected to each other along their total length so that the connecting points (32) are located in the first peripheral edge (20) and are directly adjacent each other and in the inflated front airbag a bulge is formed in the front wall in the area of the edge portions.

17 Claims, 8 Drawing Sheets

(51) Int. Cl.
  *B60R 21/205* (2011.01)
  *B60R 21/232* (2011.01)
  *B60R 21/00* (2006.01)

(52) U.S. Cl.
  CPC ..... *B60R 21/232* (2013.01); *B60R 2021/0004* (2013.01); *B60R 2021/0009* (2013.01); *B60R 2021/0048* (2013.01); *B60R 2021/23382* (2013.01)

(58) Field of Classification Search
  CPC .... B60R 2021/0004; B60R 2021/0009; B60R 2021/0048; B60R 2021/23533; B60R 2021/23538; B60R 2021/23571; B60R 2021/23576; B60R 2021/0023
  USPC .................................. 280/730.2, 732, 743.1
  See application file for complete search history.

(56) References Cited

U.S. PATENT DOCUMENTS

| | | | |
|---|---|---|---|
| 10,414,370 B2 * | 9/2019 | Schneider | B60R 21/231 |
| 10,647,284 B2 * | 5/2020 | Koshikawa | B60R 21/231 |
| 2005/0275201 A1 | 12/2005 | Schneider et al. | |
| 2006/0163848 A1 | 7/2006 | Abe | |
| 2012/0098242 A1 | 4/2012 | Aranzulla et al. | |
| 2013/0056963 A1 * | 3/2013 | Fischer | B60R 21/231 |
| | | | 280/728.1 |
| 2017/0008477 A1 | 1/2017 | Nell | |
| 2018/0126945 A1 | 5/2018 | Aranzulla et al. | |
| 2018/0222431 A1 * | 8/2018 | Nakanishi | B60R 21/231 |
| 2020/0023804 A1 * | 1/2020 | Weiss | B60R 21/2338 |

\* cited by examiner

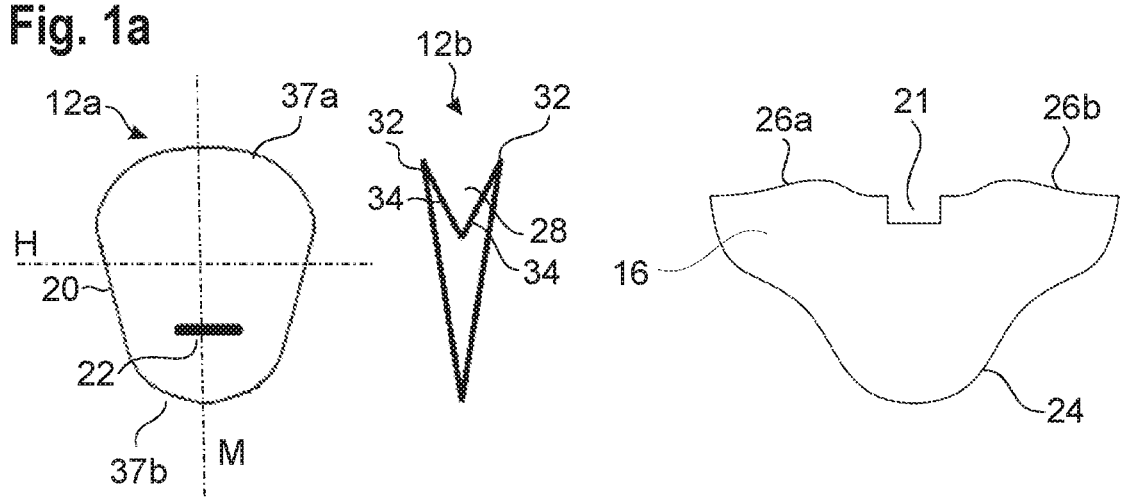
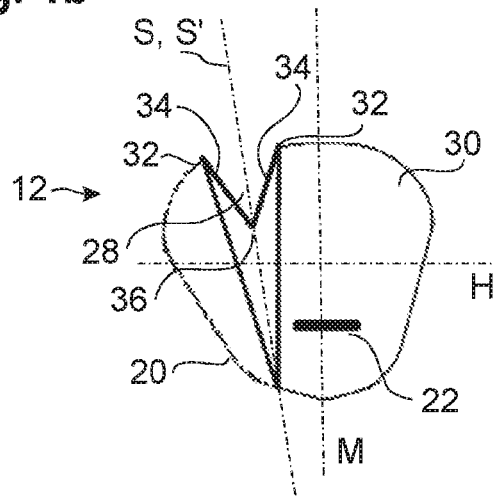
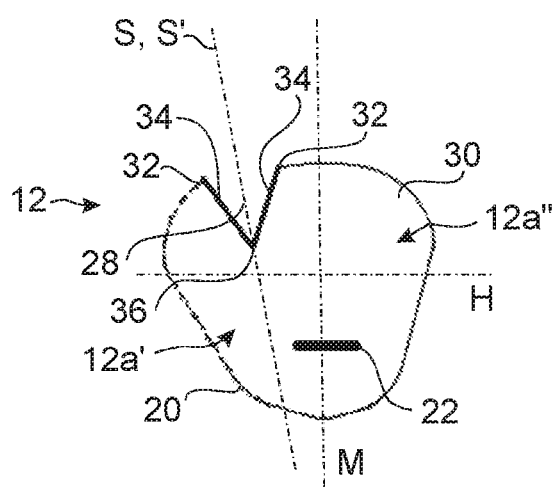
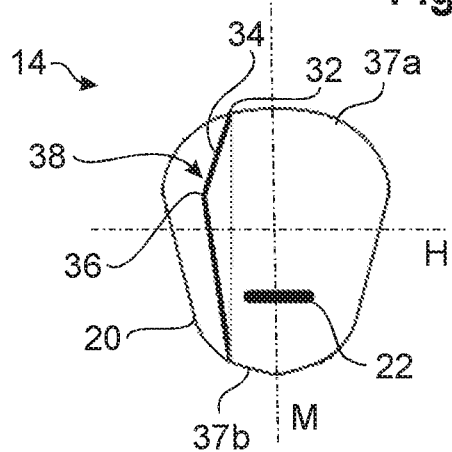

FRONT AIRBAG OF A VEHICLE PASSENGER RESTRAINT SYSTEM

The invention relates to a front airbag, especially a passenger or driver airbag for a vehicle occupant restraint system.

Front airbags which are not arranged inside the vehicle steering wheel are mainly installed in the instrument panel in the area of the passenger seat. In a known construction, the airbag includes a front wall facing the passenger in the inflated state which forms a baffle for absorbing the vehicle occupant. Said front wall is normally inclined relative to the vertical direction so that the vehicle occupant's head and upper body part may immerse into the airbag.

In the case of a known front airbag, the front wall is connected along its peripheral edge to a generally funnel-shaped peripheral wall having on a rear side facing away from the front wall an inflation orifice through which the airbag is filled and which usually also includes a fixing portion for fixing the entire front airbag to the instrument panel. Airbags of this type are also referred to as "square bags", because the front wall substantially takes a rectangular or hexagonal shape (with the corners being rounded, of course).

The invention strives for an as comprehensive protection of the vehicle occupant's head and upper body part, even in various types of frontal collisions also including a partially offset frontal crash. In such crash, for example with an overlapping of approx. 35% and an impact angle that is outwardly offset against the longitudinal vehicle axis by 15°, especially the vehicle occupant's head and upper body part are intended to be absorbed and supported, resp., by the front airbag.

It is the object of the invention to provide an improved front airbag which offers proper protection for the vehicle occupant's head and upper body part especially in the case of frontal crashes with little overlapping and the design of which can be adapted to various vehicle interior geometries in a simple and flexible manner. Accordingly, the vehicle occupant is intended to be especially prevented or hindered from sliding to the side.

This object is achieved by a front airbag comprising the features of claim 1. In accordance with the invention, the front airbag of a vehicle occupant restraint system includes an outer cover having a front wall and a peripheral wall, wherein a fixing portion for fixing the front airbag tightly to the vehicle is provided on the peripheral wall and the front wall constitutes a baffle for the vehicle occupant. The front wall includes a circumferential first peripheral edge which is connected at a circumferential second peripheral edge of the peripheral wall circumferentially to the latter, with the length of the two peripheral edges being equal. The front wall has a flatly spreadable cut. The cut of the front wall exhibits at least one notch starting from the first peripheral edge at two connecting points, wherein an edge portion of the notch extends from each connecting point to the inside of the cut so that the two edge portions are convergent at least substantially V-shaped and meet in one point. In the finished front airbag, the two edge portions are connected to each other along their entire length so that the connecting points are located in the first peripheral edge and are directly adjacent each other. In the inflated front airbag, a bulge is formed in the front wall in the area of the edge portions.

In an especially advantageous manner, the front wall has a one-piece cut.

The front wall may also advantageously be formed of two or more cuts which are interconnected, especially joined by sewing, along a line of symmetry of the notch. In this way, too, the front wall remains to be flatly spreadable before connecting the peripheral edges and connecting the V-shaped part of the edge portions.

The inside of the cut of the front wall is defined by an imaginary envelope in this case resulting from the first peripheral edge and an imaginary rectilinear connection between the respective connecting points of a notch.

As compared to the front wall in the conventional square bag, the cut of the airbag according to the invention includes excess material forming the bulge. Irrespective of the type, shape, depth and number of the notches, in the finished front airbag the first peripheral edge always has the same length and shape, however, so that always the same peripheral wall can be used.

The front airbag is preferably used as passenger airbag, although it would be possible as driver airbag as well.

The outer cover of the front airbag can be formed completely of the front wall and the peripheral wall, substantially no further cut parts need to be used (apart from possible reinforcing layers or the like).

Connecting the two edge portions to each other is facilitated when the two edge portions of the notch extend mirror-inverted so that the notch has an axis of symmetry. In any case, however, the two edge portions have the same length.

It is possible to provide plural notches which may be distributed over the front wall cut in any way. Especially preferred, two or four notches are provided. The notches are arranged to be spaced apart from each other along the first peripheral edge and the respective connecting points thereof are interconnected in the finished front airbag so that the peripheral edge is closed at all connecting points.

It has turned out to be favorable to some intended use when, in the finished front airbag, the first peripheral edge is symmetrical relative to an imaginary centerline and the notch is arranged offset against said centerline in the cut of the front wall. In this case, also the bulge in the front wall is located on the side of the centerline in the inflated state, which may offer protection against lateral sliding or an enlarged baffle in the lateral direction.

In the mounted and inflated state of the front airbag, the centerline may divide the front airbag along the vertical in a top view.

For example, an imaginary axis of symmetry of the notch may be inclined relative to the centerline. This allows producing bulges that offer proper protection against lateral sliding.

Of course, also a parallel alignment of the axis of symmetry with the centerline is possible, which is favorable to different shapes of the bulges of the front wall.

In another possible arrangement, at least two notches arranged symmetrically relative to the centerline are provided. This results in a front wall having bulges disposed symmetrically relative to the centerline.

Two notches may be opposed in the cut of the front wall also in such manner that the axes of symmetry of the two notches are located on a straight line.

It is also possible to provide two notches which converge from opposite portions of the first peripheral edge and especially include edge portions which extend mirror-inverted.

Accordingly, it has turned out to be advantageous when the notches start from upper and lower portions of the first peripheral edge so as to provide a bulge in the area on the side of the centerline. The terms "upper" and "lower" always refer to the orientation of the front wall in the mounted inflated state. That is to say, the upper and lower edges of the front wall in the mounted inflated state is are referred to as upper and, resp., lower edge in the spread cut part of the front wall, which defines "upper" and "lower" also in the spread state of the cut part.

Of preference, the upper notch is configured to be deeper than the lower notch so as to produce a larger bulge in the upper area of the front wall.

The two edge portions of a notch may generally be linear, but they may as well be curved. If they follow a curvature, they are preferably convexly curved so as to produce a bulge outwardly directed in the center thereof in the front wall in the inflated state.

When the front wall is to be laterally outwardly enlarged, the at least one notch, preferably two notches extending toward each other, can extend in a lateral third of the front wall cut.

In a possible arrangement, notches extending toward each other from opposite portions of the first peripheral edge are provided through the deepest points of which an imaginary connecting line extends which, related to the front wall spread and aligned corresponding to the mounted and inflated state of the front airbag, extends at an angle of from 60° to 80° vis-à-vis a horizontal line.

In particular, the connecting line may delimit a lateral upper corner portion against the remainder of the front wall cut. Preferably, the surface area of the corner portion corresponds to a maximum of 30% of the total surface area of the front wall cut.

Of course, the front airbag according to the invention may also be provided inside with tethers, e.g. also actively releasable tethers.

Hereinafter the invention will be described in detail by way of plural embodiments in connection with the enclosed drawings, wherein:

FIGS. 1a to 1c show cut parts of a front airbag according to the invention in accordance with a first embodiment;

FIG. 1d shows a schematic view of the front wall finished from the cut of FIG. 1c;

FIGS. 1a to 1c show a cut of a front airbag 10 (see FIG. 2) according to a first embodiment in various representations illustrating the development of the design of the front wall cut 12.

Figure 2:
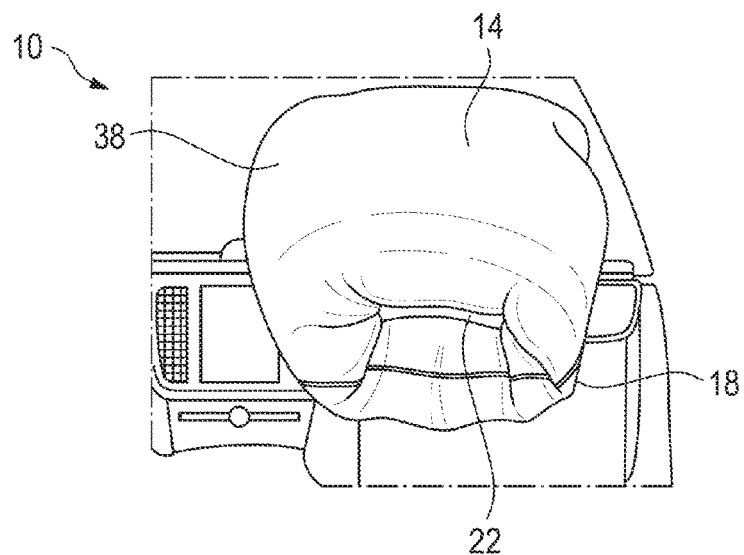
FIG. 2 shows the finished mounted and inflated front airbag including the front wall of FIG. 1d.

The front airbag 10 substantially consists of two cut parts, a front wall cut 12 which solely forms the later front wall 14 and a peripheral wall cut 16 which later solely forms the peripheral wall 18 of the front airbag 10 (each irrespective of possible reinforcing layers or the like not shown here). Each of the two cut parts 12, 16 is flatly spreadable per se.

FIG. 1a illustrates the difference between the front airbag 10 according to the invention and a front airbag according to the state of the art.

The front wall cut 12 can be mentally subdivided into a cut part 12a and an allowance 12b separate therefrom and arrowhead-shaped in this case which altogether result in the surface area of the front wall cut 12 (cf. FIGS. 1b and 1c).

The cut part 12a corresponds to a known front wall cut for a so-called square bag and is limited by a circumferential first peripheral edge 20.

The cut part 12a is symmetrical relative to a centerline M, wherein in a top view onto the finished and inflated front airbag 10 in the mounted position the centerline M also passes through the fixing portion 21 by which the peripheral wall 18 is fixed to the vehicle and which also forms an inflation orifice for filling gas to be introduced.

The reference numeral 22 denotes a portion which is located in the lower fourth of the front wall 14 and in which the front wall 14 is connected to the rear wall or to the module directly or via a tensile means so that an indentation is resulting which is evident from FIGS. 2, 4, 6 and 8. The front wall 14 is coupled to the rear wall or to the module especially via a linearly and substantially horizontally extending portion 22 so as to produce the indentation. This idea is not limited to the shown embodiment but is rather generally applicable to all airbags according to the invention.

In the front airbag 10 according to the invention, the front wall cut 12 is mentally composed of the cut part 12a and the allowance 12b, as mentioned already. The allowance 12b expands the cut part 12a in that it is (mentally) inserted into the cut part 12a, as shown in FIG. 1b. Therefrom the altogether one-piece front wall portion 12 of FIG. 1c is resulting.

As is evident from FIGS. 1b and 1c, the shape of the allowance 12b is selected so that a notch 28 is formed which protrudes into the interior 30 of the front wall cut 12, with the notch 28 at two connecting points 32 starting from the first peripheral edge 20 of the front wall cut 12.

The interior 30 of the front wall cut 12 is defined here by the peripheral edge 20 of the front wall cut 12 as well as an imaginary (linear) connection between the two connecting points 32.

The first peripheral edge 20 is connected over its entire length to a peripheral edge 24 of the peripheral wall cut 16 forming a portion of the entire peripheral edge of the peripheral wall cut 16. The residual peripheral edge portions 26a, 26b of the peripheral wall cut 16 are located on both sides of the fixing portion 22 and are connected to each other so that the peripheral wall 18 as a whole is funnel-shaped.

In the finished front airbag 10 the second peripheral edge 24 of the peripheral wall 18 is circumferentially closed and, as to its length, is identical to the first peripheral edge 20 of the front wall 14 and is adapted thereto also as to shape and curvature. Therefore, at its first peripheral edge 20 the front wall 14 can be connected to the second peripheral edge 24 of the peripheral wall 18 without any folds occurring.

A front airbag which is composed only of the cut parts 12*a*, 16 in the inflated state includes a front wall 14 symmetrical to the centerline M which, though in practice being curved due to the inherent flexibility of the front airbag, basically constitutes a flat baffle.

The notch 28 is delimited by two edge portions 34 which are convergent and meet in a common point 36. In the examples shown here the two edge portions 34 are approximately V-shaped.

In general, it is essential that the two edge portions 34 basically have the same length and are formed and arranged mirror-inverted to each other. This results in the fact that each notch 28 has an axis of symmetry S.

Here the axis of symmetry S of the notch 28 is inclined relative to the centerline M. Moreover, the entire allowance 12*b* is positioned on the side of the centerline M. The allowance 12*b* in this case takes the shape of an isosceles acute triangle the basis of which includes the notch 28 (cf. FIGS. 1*a* and 1*b*). The notch 28 is located at an upper portion 37*a* of the first peripheral edge 20 in the mounted and inflated state of the front airbag 10, while the corner of the allowance 12*b* opposed to the notch 28 is positioned at a point in a lower portion 37*b* of the first peripheral edge 20.

For finishing the front wall 14 the two edge portions 34 are connected to each other along their overall length so that the two connecting points 32 coincide and the notch 28 is closed. This state is shown in FIG. 1*d*.

The front wall 14 now has a circumferential first peripheral edge 20 exactly corresponding to the first peripheral edge 20 of the cut part 12*a* as to shape and length.

As a consequence, also the peripheral wall cut 16 need not be varied vis-à-vis the conventional square bag the front wall of which is formed only by the cut part 12*a*. As is known, the front wall 14 is connected along its first peripheral edge 20 to the second peripheral edge 24 of the peripheral wall 18 so that the finished front airbag 10 is formed (see FIG. 2).

In the area of the allowance 12*b* and the notch 28, excess material is formed which in the inflated state of the front airbag 10 results in a bulge 38 in which the front wall 14 projects outwardly, especially perpendicularly or laterally relative to the residual front wall 14, as compared to a front wall formed solely by the cut part 12*a*.

In this example, the bulge 38 is located on the side of the centerline M, as the allowance 12*b* is positioned on the side of the centerline.

By appropriately selecting the shape and the arrangement of the allowance(s) 12*b* the front wall 14 may have a very versatile design and thus may be easily adapted to different vehicle interior geometries. Accordingly, the allowance 12*b* may be added, at the discretion of those skilled in the art, in any shape, size and orientation to the actual basic cut, viz. the cut part 12*a*, so as to impart a desired three-dimensional shape to the front wall 14 in the inflated state of the front airbag 10. Of course, also plural separate allowances 12*b* can be inserted in the cut part 12*a* at different positions.

This principle is illustrated for several basic variants by way of the following exemplary embodiments.

Even when the allowance 12*b* is partially shown as a separate part here, this serves merely for the purpose of illustration. The finished front wall cut 12 is always in one piece, as is shown in FIG. 1*c*, for example.

In order to obtain the finished front wall cut 12, in a variant the entire front wall cut 12 is cut out of a fabric layer already in one piece.

It is also possible, however, in a different variant to subdivide the front wall cut 12 into plural individual cut parts and to compose, especially to join the latter by sewing (as indicated in FIG. 1*c* by the reference numerals 12*a*' and 12*a*"). The individual cut parts are divided along the axes of symmetry S. In the Figures, the possible subdivisions are marked by S'. The finished front wall cut 12 produced in this way does not differ from the one-piece front wall cut 12 as to its outer contour.

In all embodiments, the first peripheral edge 20 is identical in shape and length to that of the basic cut part 12*a*, viz. the front wall of a conventional square bag.

Since the basic principle is equal in all embodiments and they merely differ as to the shape of the allowance 12*b*, for better comprehension the already introduced reference numerals are continued to be used in all embodiments.

FIGS. 3*a* to 3*d* and 4 illustrate a front airbag 10 as well as the front wall cut 12 thereof according to a second embodiment.

In contrast to the afore-described first embodiment, in this case two notches 28*a*, 28*b* are provided. The excess material 12*b* can be shown here as a rectangle at each opposite narrow side of which a notch 28 is formed, wherein the two notches 28*a*, 28*b* are identical as to shape and size.

The excess material 12*b* is obliquely inserted on the side of the centerline M of the cut part 12*a* so that one of the notches 28*a* is arranged in the upper portion 37*a* of the first peripheral edge and the second notch 28*b* is arranged in the lower portion 37*b*.

The two points 36 in which the respective edge portions 34 meet are located on the axis of symmetry S of both notches 28*a*, 28*b*.

Whereas in the first embodiment the angle between the centerline M and the axis of symmetry S is open to the top (related to the mounted and inflated state of the front airbag 10), in the second embodiment said angle opens to the bottom.

The imaginary connecting line between the points 36 coinciding in this case with the axis of symmetry S separates a lateral upper corner portion 40 from the remainder of the front wall cut 12. The surface area of this corner portion 40 in these examples amounts to a maximum of 30% of the total surface area of the front wall cut 12.

The axis of symmetry S in this case extends especially at an angle of from 60° to 80° relative to a horizontal line H (related to the front wall 14 spread and aligned corresponding to the mounted and inflated state of the front airbag 10).

Figure 3A:
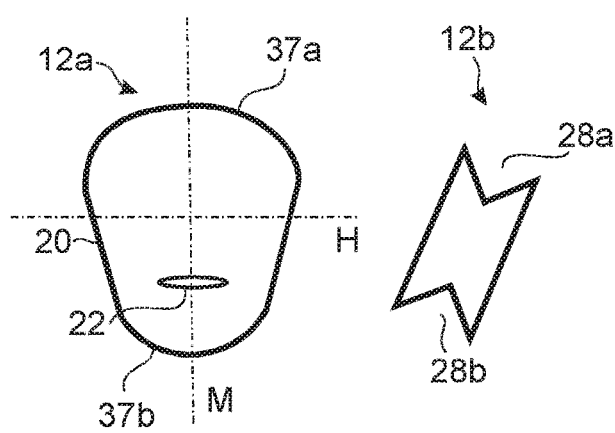
FIGS. 3a to 3c show a front wall cut for a front airbag according to the invention in accordance with a second embodiment.
Figure 3B:
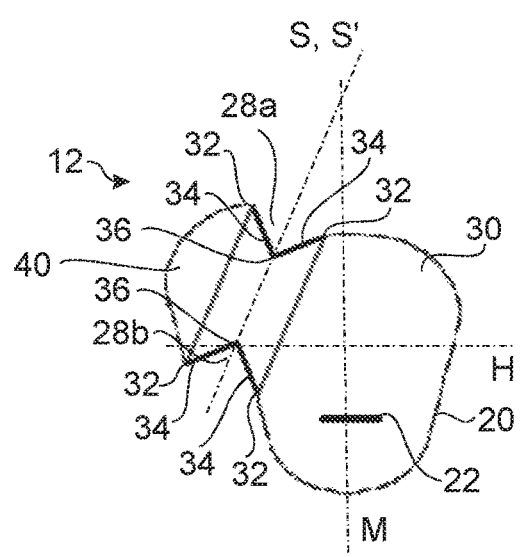
Figure 3C:
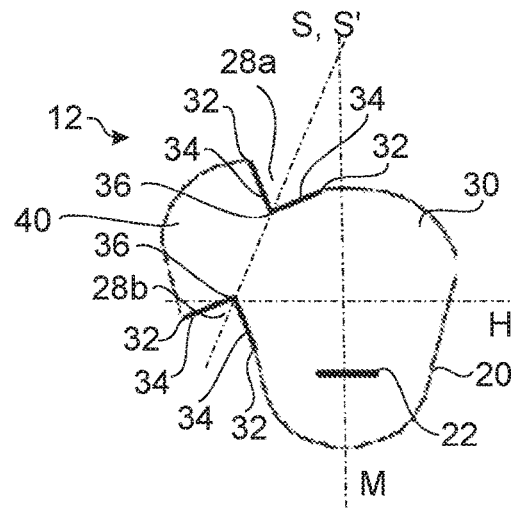
Figure 3D:
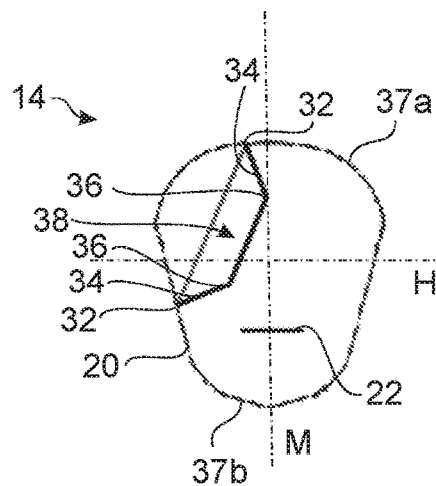
FIG. 3d shows a schematic view of the front wall finished from the cut of FIG. 3c.

After connecting the respective edge portions 34 of the individual notches 28*a*, 28*b*, the finished front wall 14 shown in FIG. 3*d* including a corresponding bulge 38 shown here as a turned-over fold is resulting.

Figure 4:
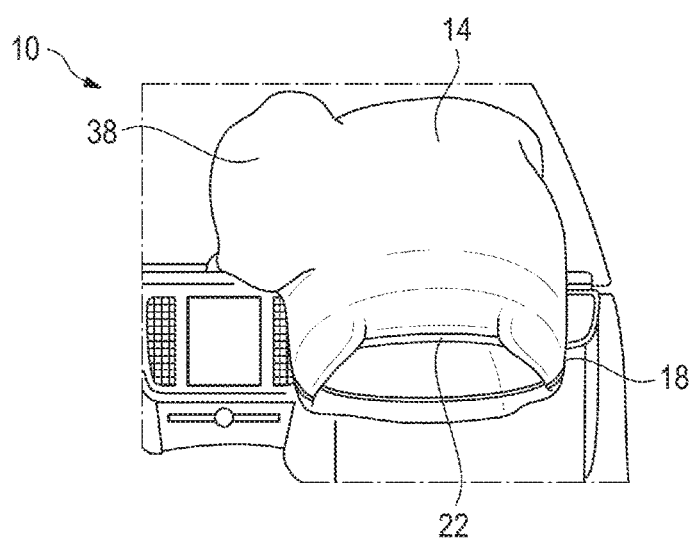
FIG. 4 shows the finished mounted and inflated front airbag including the front wall of FIG. 3d.
Figure 5A:
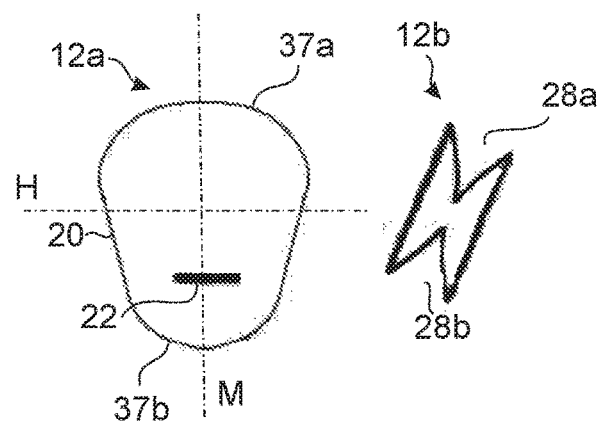
FIGS. 5a to 5c show a front wall cut for a front airbag according to the invention in accordance with a third embodiment.
Figure 5B:
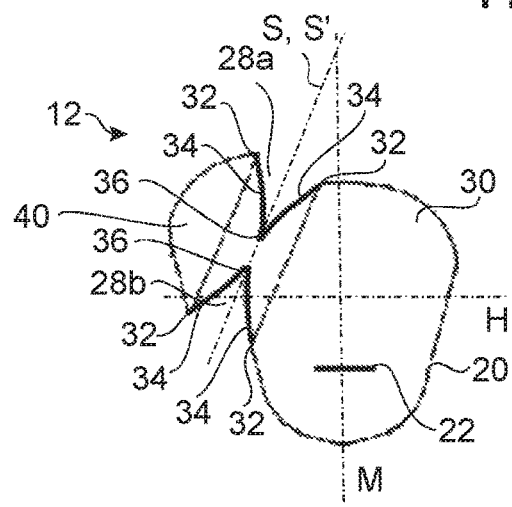
Figure 5C:
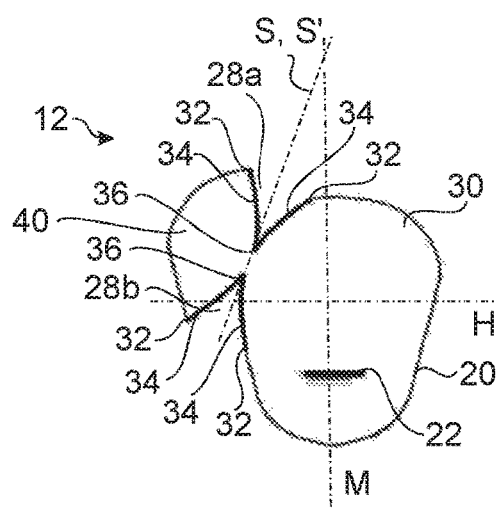
Figure 5D:
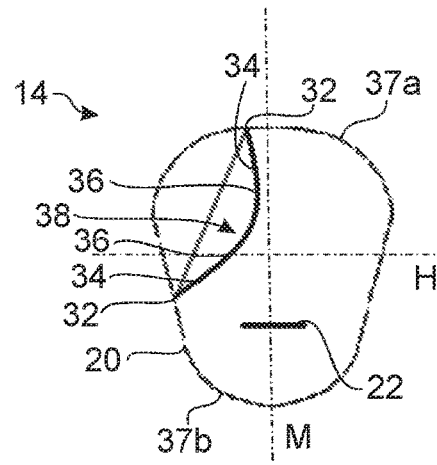
FIG. 5d shows a schematic view of the front wall finished from the cut of FIG. 5c.

In the inflated and mounted state as shown in FIG. 4, the bulge 38 forms sort of an ear laterally projecting in an extension of the residual front surface 14.

FIGS. 5*a* to 5*d* and 6 illustrate a third embodiment showing a variant of the afore-described embodiment.

The allowance 12*b* is designed and arranged similarly to the afore-described embodiment. The substantial difference resides in the fact that in this embodiment the edge portions 34 do not extend linearly as in the first and second embodiments but are convexly curved. Of course, also in this case the respective edge portions 34 of the individual notches 28*a*, 28*b* are mirror-inverted and have exactly the same length so that they can be easily connected to each other.

Figure 6:
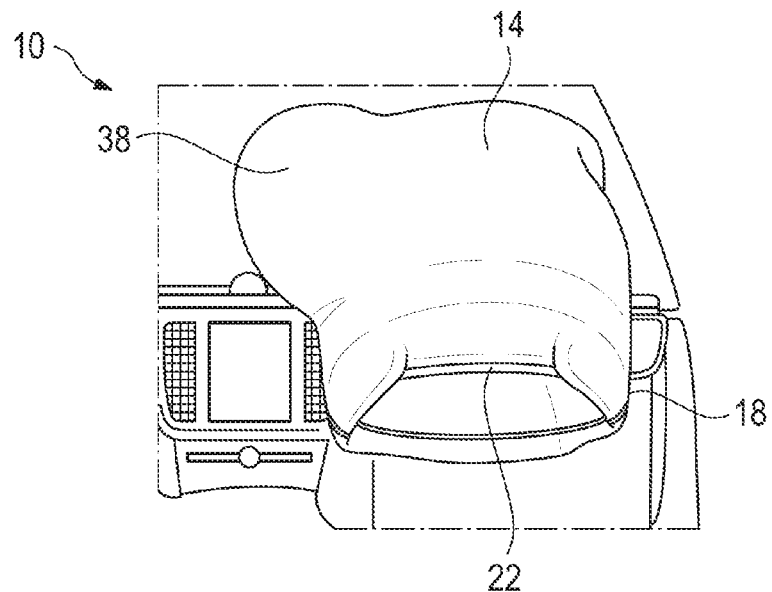
FIG. 6 shows the finished mounted and inflated front airbag including the front wall of FIG. 5d.
Figure 7A:
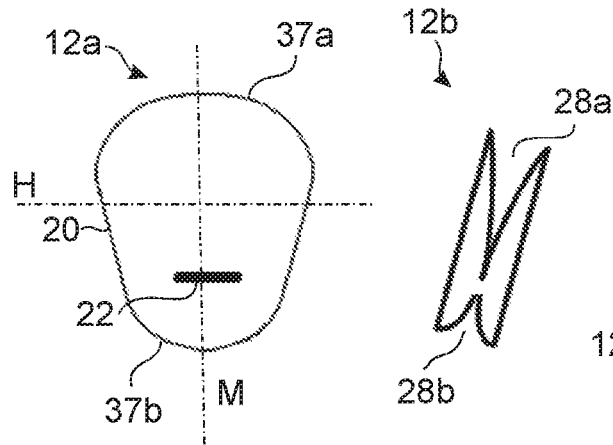
FIGS. 7a to 7c show a front wall cut for a front airbag according to the invention in accordance with a fourth embodiment.
Figure 7B:
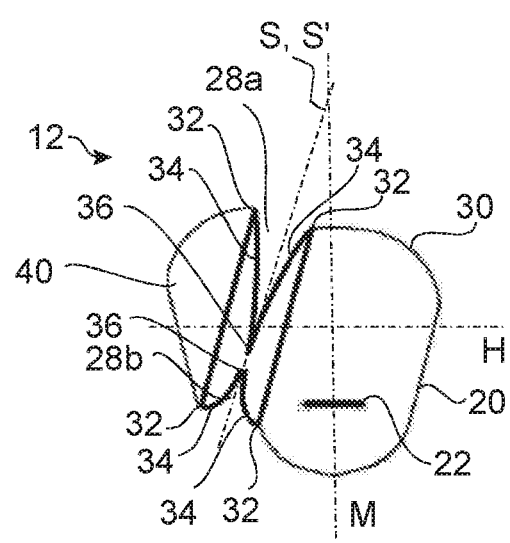
Figure 7C:
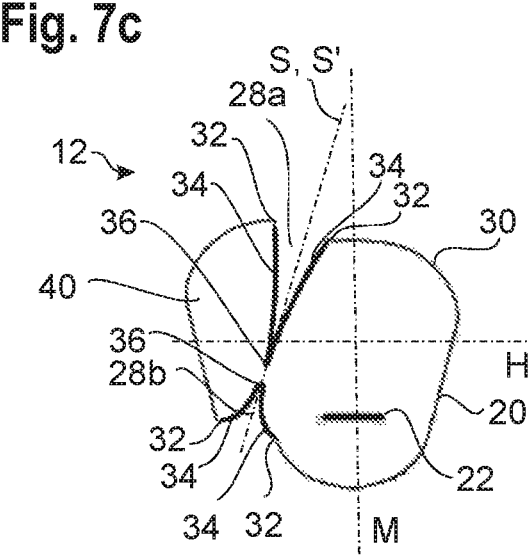
Figure 7D:
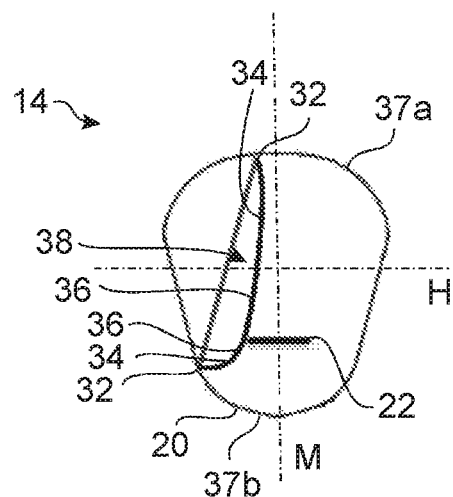
FIG. 7d shows a schematic view of the front wall finished from the cut of FIG. 7c.
Figure 8:
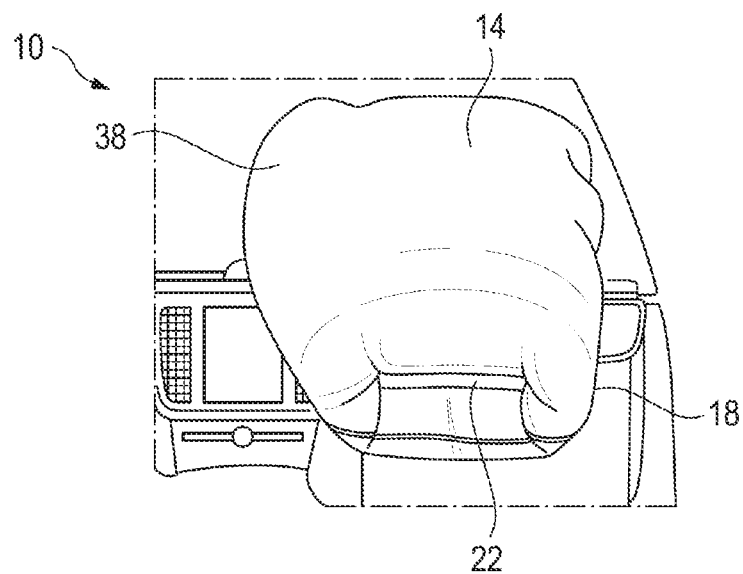
FIG. 8 shows the finished mounted and inflated front airbag including the front wall of FIG. 7d.

The convex shape of the edge portions 34 results in a rounder bulge 38 (see FIG. 6).

FIGS. 7a to 7d and 8 illustrate a fourth embodiment.

In contrast to the third embodiment, the two notches 28a, 28b are different in depth, with the upper notch 28a in the mounted state is deeper than the lower notch 28b. This embodiment illustrates another design variant for using the allowance 12b.

In the fifth embodiment shown in FIGS. 9a to 9d, two separate allowances 12b are provided which are used at different positions of the cut part 12a.

Figure 9A:
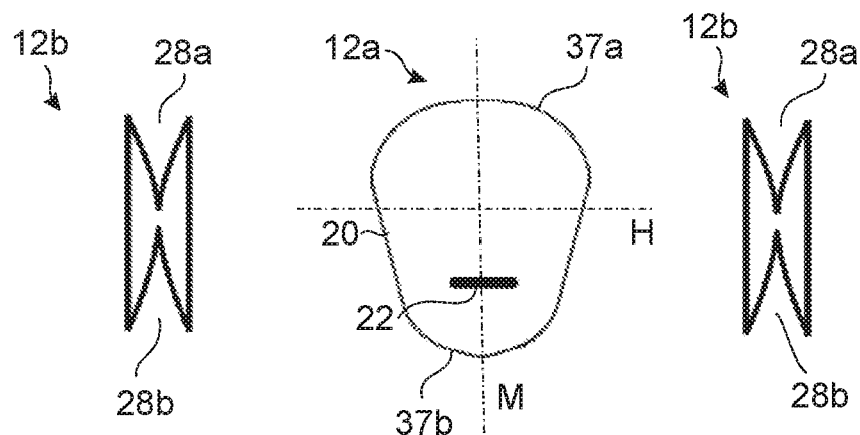
FIGS. 9a to 9c show a front wall cut for a front airbag according to the invention in accordance with a fifth embodiment.
Figure 9B:
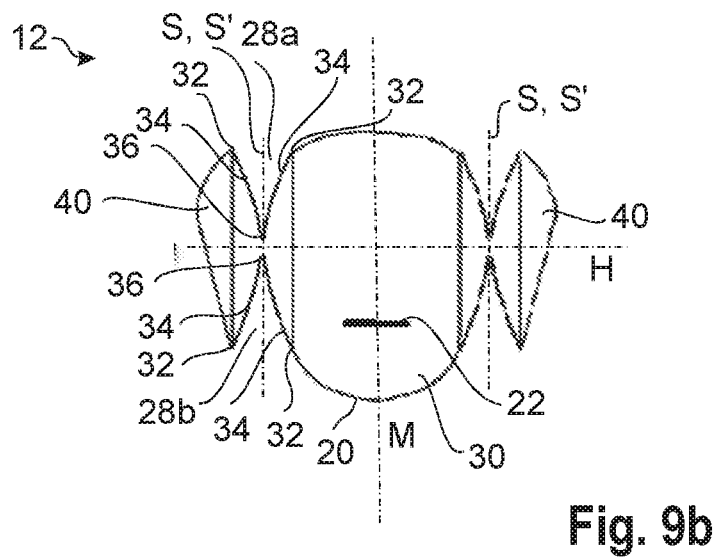
Figure 9C:
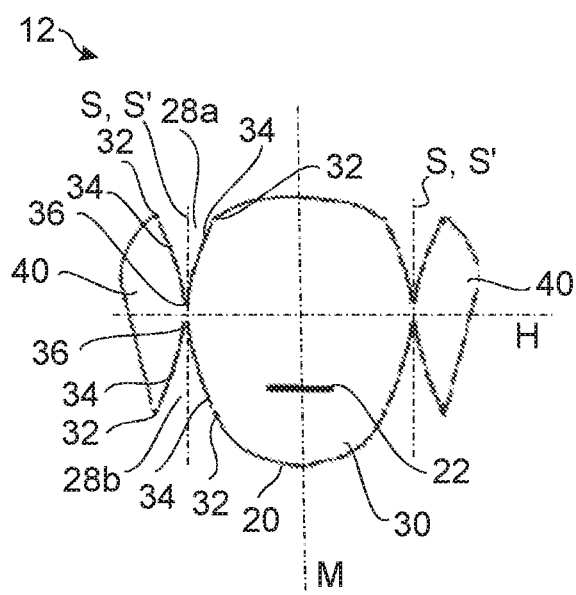
Figure 9D:
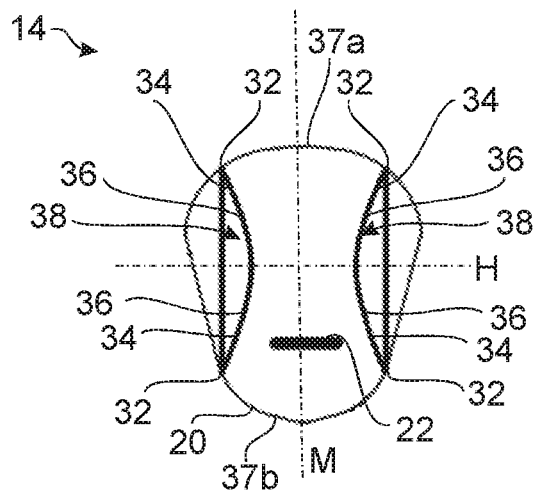
FIG. 9d shows a schematic view of the front wall finished from the cut of FIG. 9c.
Figure 10A:
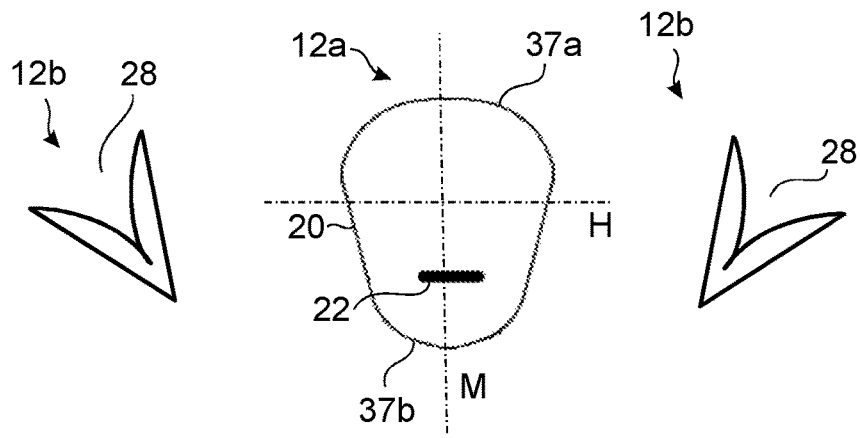
FIGS. 10a to 10c show a front wall cut for a front airbag according to the invention in accordance with a sixth embodiment.
Figure 10B:
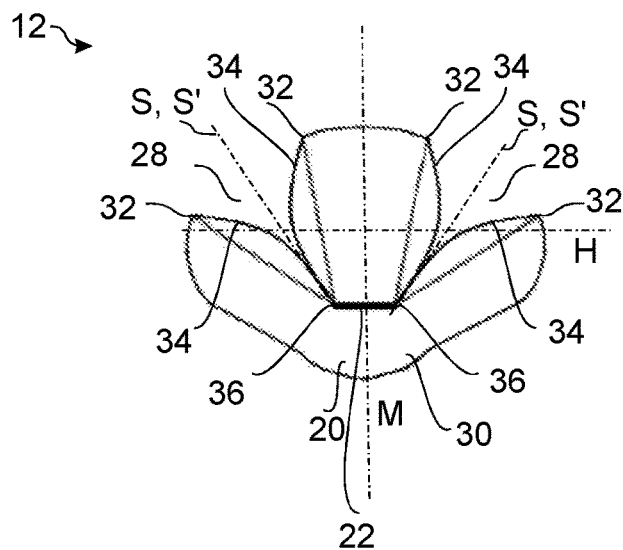
Figure 10C:
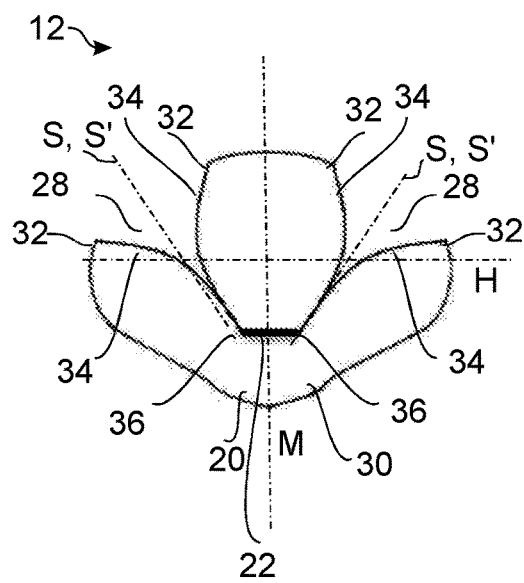
Figure 10D:
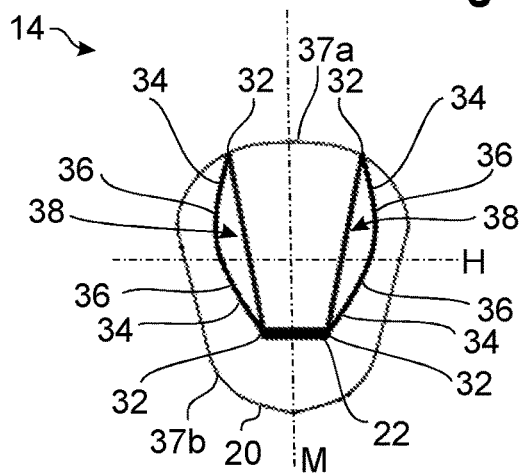
FIG. 10d shows a schematic view of the front wall finished from the cut of FIG. 10c.

In this example, both allowances 12b are identical and are arranged on both sides of the centerline M symmetrically to the latter (cf. FIG. 9b).

As to their shape, the allowances 12b correspond to the third embodiment, but the axes of symmetry S which also here again pass through the two lowermost points 36 are aligned in parallel to the centerline M.

As a result, the bulge 38 is centrally aligned in the finished front wall 14 and substantially extends over the entire width of the front wall 14.

In the sixth embodiment shown in FIGS. 10a to 10d, just as in the fifth embodiment, two separate allowances 12b are provided equally in identical (though possibly mirror-inverted) shape, which are equally inserted in the cut part 12a on both sides of the centerline M and symmetrically thereto.

However, only one notch 28 is provided in each allowance 12b and each of the allowances takes the shape of an isosceles acute triangle, with the notch 28 being formed at the base. The two edge portions of each notch 28 are convexly curved in this case.

In contrast to the other configurations, the allowance 12b, viz. in this case the point of the triangle opposite to the notch 28, ends inside the cut 12 and not at the peripheral edge 20 thereof. The axes of symmetry S of the two notches 28 are inclined relative to the centerline M and are downwards convergent thereto. Both notches 28 are arranged in the upper portion 37a of the first peripheral edge 20 of the front wall 14.

The bulge 38 resulting herefrom is restricted to the upper part of the front wall 14.

Each of the notches 28 here is arranged in a lateral third of the front wall cut 12. The exact positioning just as the number, shape and orientation of the individual notches 28 and the edge portions 34 thereof as well as in general the shape and size of the allowance(s) 12b are up to the discretion of those skilled in the art.

The invention claimed is:

1. A front airbag of a vehicle occupant restraint system comprising an outer cover including a front wall (14) and a peripheral wall (18), wherein a fixing portion (22) for fixing the front airbag (10) tightly to the vehicle is provided on the peripheral wall (18) and the front wall (14) constitutes a baffle for the vehicle occupant and includes a circumferential first peripheral edge (20) which is circumferentially connected at a circumferential second peripheral edge (24) of the peripheral wall (18) to the latter, with the length of the two peripheral edges (20, 24) being equal, wherein the front wall (14) includes a cut (12) that is flatly spreadable and the front wall cut (12) has at least one notch (28; 28a, 28b) starting at two connecting points (32) from the first peripheral edge (20), wherein from each of the connecting points (32) an edge portion (34) of the notch (28; 28a, 28b) extends into the interior (30) of the front wall cut (12) so that the two edge portions (34) are convergent in V-shape and meet in a point (36), and in the finished front airbag (10) the two edge portions (34) are connected to each other along their total length so that the connecting points (32) are located in the first peripheral edge (20) and are directly adjacent each other and in the inflated front airbag (10) a bulge (38) is formed in the front wall (14) in the area of the edge portions (34).

2. The front airbag according to claim 1, wherein the front wall (14) includes a one-piece cut (12).

3. The front airbag according to claim 1, wherein the two edge portions (34) of the notch (28; 28a, 28b) extend mirror-inverted so that the notch (28; 28a, 28b) has an axis of symmetry (S).

4. The front airbag according to claim 1, wherein plural notches (28a, 28b) are provided.

5. The front airbag according to claim 1, wherein in the finished front airbag (10) the first peripheral edge (20) is symmetrical relative to an imaginary centerline (M) and the notch (28; 28a, 28b) is arranged in the front wall cut (12) offset against said centerline (M).

6. The front airbag according to claim 5, wherein an imaginary axis of symmetry (A) of the notch (28; 28a, 28b) is inclined relative to the centerline (M).

7. The front airbag according to claim 1, wherein in the finished front airbag (10) the first peripheral edge (20) is symmetrical relative to an imaginary centerline (M) and at least two notches (28a, 28b) which are arranged symmetrically relative to the centerline (M) are provided.

8. The front airbag according to claim 1, wherein two notches (28a, 28b) are provided which are opposed to each other in the front wall cut (12) so that the axes of symmetry (S) of the two notches (28a, 28b) are located on a straight line.

9. The front airbag according to claim 1, wherein two notches (28a, 28b) are convergent from opposite portions of the first peripheral edge (20).

10. The front airbag according to claim 9, wherein the notches (28a, 28b) start from upper and lower portions (37a, 37b) of the first peripheral edge (20).

11. The front airbag according to claim 10, wherein the upper notch (28a) is configured to be deeper than the lower notch (28b).

12. The front airbag according to claim 1, wherein the two edge portions (34) of a notch (28; 28a, 28b) extend linearly.

13. The front airbag according to claim 1, wherein the two edge portions (34) of a notch (28; 28a, 28b) extend to be curved.

14. The front airbag according to claim 1, wherein at least one notch (28; 28a, 28b) extends in a lateral third of the front wall cut (12).

15. The front airbag according to claim 1, wherein notches (28a, 28b) converging from opposite portions of the first peripheral edge (20) are provided, with an imaginary connecting line (S) extending through the deepest points (36) thereof and, related to the front wall spread and orientated corresponding to the mounted and inflated state of the front airbag, extending at an angle of from 60° to 80° vis-à-vis a horizontal line (H).

16. The front airbag according to claim 15, wherein the connecting line (S) delimits a lateral upper corner portion (40) against the remainder of the front wall cut (12).

17. The front airbag according to claim 16, wherein the surface area of the corner portion (40) corresponds to a maximum of 30% of the total surface area of the front wall cut (12).

* * * * *